(12) United States Patent
Asmussen

(10) Patent No.: US 7,337,981 B2
(45) Date of Patent: Mar. 4, 2008

(54) VIBRATION DAMPING SYSTEM

(75) Inventor: John Christian Asmussen, Copenhagen S (DK)

(73) Assignee: Rockwool International A/S, Hedehusene (DK)

( * ) Notice: Subject to any disclaimer, the term of this patent is extended or adjusted under 35 U.S.C. 154(b) by 187 days.

(21) Appl. No.: 10/495,245

(22) PCT Filed: Nov. 12, 2002

(86) PCT No.: PCT/DK02/00753

§ 371 (c)(1),
(2), (4) Date: Jun. 17, 2004

(87) PCT Pub. No.: WO03/042457

PCT Pub. Date: May 22, 2003

(65) Prior Publication Data

US 2004/0262415 A1    Dec. 30, 2004

(30) Foreign Application Priority Data

Nov. 14, 2001 (EP) .................... 01610115

(51) Int. Cl.
*E01B 9/38* (2006.01)
(52) U.S. Cl. ................................. 238/283
(58) Field of Classification Search ............ 238/2, 238/382, 283; 264/112, 120, 128, 241, 669, 264/510; 428/208, 113, 290.1, 297.4
See application file for complete search history.

(56) References Cited

U.S. PATENT DOCUMENTS

| 3,012,923 | A | * | 12/1961 | Slayter | 156/62.2 |
|---|---|---|---|---|---|
| 4,311,273 | A | * | 1/1982 | Marsh | 238/1 |
| 4,500,037 | A | * | 2/1985 | Braitsch et al. | 238/2 |
| 4,696,429 | A | * | 9/1987 | Ortwein | 238/2 |
| 4,950,355 | A | * | 8/1990 | Klose | 156/204 |
| 5,060,856 | A | | 10/1991 | Ortwein | |
| 5,487,501 | A | * | 1/1996 | Engst et al. | 238/2 |
| 2003/0175486 | A1 | * | 9/2003 | Pedersen | 428/208 |
| 2004/0121096 | A1 | * | 6/2004 | Asmussen | 428/34.1 |

FOREIGN PATENT DOCUMENTS

| DE | 3527829 | 2/1987 |
|---|---|---|
| EP | 0498276 | 8/1992 |
| EP | 0922808 | 6/1999 |
| EP | 1045071 | 10/2000 |
| EP | 1184512 | 3/2002 |
| WO | WO 8800265 A1 * | 1/1988 |
| WO | 9302259 | 2/1993 |
| WO | 9947766 | 9/1999 |
| WO | 0073600 | 12/2000 |
| WO | WO 00/73600 A1 * | 12/2000 |

* cited by examiner

*Primary Examiner*—S. Joseph Morano
*Assistant Examiner*—Robert J. McCarry, Jr.
(74) *Attorney, Agent, or Firm*—Dykema Gossett PLLC

(57) ABSTRACT

The invention relates to a vibration damping system, which comprises an anti-vibration plate in the form of a plate having a first and a second major surface, wherein the first major surface may preferably be covered with a layer of surfactant-free geotextile. The anti-vibration plate comprises one or more layers, preferably a top layer and one or more bottom layers. Furthermore, it is essential that the anti-vibration plate is preferably obtainable by a method comprising the step of subjecting an area of the opposite surfaces of the plate to a compression treatment in one or more steps, which compression treatment is sufficient to reduce the static and/or the dynamic stiffness of the plate compared to the static and/or dynamic stiffness prior to the compression. The invention also relates to the method of applying a vibration damping system and the use of a vibration damping system.

13 Claims, No Drawings

VIBRATION DAMPING SYSTEM

BACKGROUND OF THE INVENTION

1. Field of the Invention

The invention relates to a vibration damping system, especially for use in the damping of vibrations, e.g., from trains, other traffic and damping of ground borne vibrations in general.

2. The Prior Art

In the prior art, it is well known to incorporate elastic material under traffic lines and in particular under tracks for trains, trolley busses, tramcars and similar traffic lines in order to damp the vibrations caused by this heavy traffic. In the prior art material layers of elastic material especially made from rubber, PUR-foams and cork, respectively, as well as combinations thereof, have been used for damping such vibrations.

One of the preferred materials for the damping of vibrations has so far been plates or mats of vulcanised rubber which have excellent elastic properties for use as vibration damping material. Vibration damping constructions, wherein the vibration damping elements are constituted by rubber, have in most situations an acceptable vibration damping efficiency; however, the amount of rubber necessary in such constructions in many situations results in a relatively expensive product. Furthermore, there can be a general interest to avoid or reduce the use of rubber materials due to environmental pollution during its production and pollution due to escape of additives, e.g., softening additives during use in moist environments, U.S. Patent No. 5,060,856 describes such an elastomeric mat for use, e.g., in damping of the sound from trains.

It has also been tried to use a mineral fibre board as sound damping material in railway construction, e.g. as disclosed in DE 35 27 829 and in EP patent publication no. 922 808. This sound damping system has shown to be very good in certain situations.

In general, it has been found that the use of mineral fibre mats or boards in vibration damping systems for railway foundations is highly desirable due to adequate performance, easy installation, 100% recycling ability, low pollution effect and a competitive price. However with the known mineral fibreboards there is a risk, when it is used over a long period under high loads, such as the forces from ballast gravels during passage of train, that this may have an effect on the mineral fibre material over time. This ageing effect is also seen with some of the known rubber and PUR-materials.

By incorporating the above materials in railway tracks for damping vibration, it has been observed that there is a risk that the load from passing trains imposed in the vibration damping system causes an ageing of such system over time. Such ageing is characterized by a change in static and dynamic stiffness of the anti-vibration plate of the vibration damping system, which is unwanted. For instance, the static and the dynamic stiffness of the anti-vibration plate may decrease significantly during the first 5 to 10 years of use.

Normally it is desired that a vibration damping system under railways should have a durability of about 40 years. A minimum demand from Deutsche Bahn-Norm (Technische Lieferbedingungen BN 918 071-1, September 2000) is that through mechanical excitation the static stiffness of the anti-vibration plate of the vibration damping system may not decrease or increase more than about 10-20% during a simulated 40 years period in the laboratory.

According to standard and practical experience the static and dynamic stiffness should preferably be substantially constant over time.

Accordingly, there remains a need for a vibration damping system of the above-mentioned kind which does not exhibit the above-identified drawbacks.

The object of the invention is therefore to provide a vibration damping system comprising an anti-vibration plate with improved stability with respect to static and particularly dynamic stiffness, and preferably comprising an anti-vibration plate with a substantially constant static and dynamic stiffness during its life time defined as 40 years.

Another object of the invention is to provide a vibration damping system comprising an anti-vibration plate having an upper surface which is sufficiently strong to withstand and distribute the forces from the ballast layer. This surface protects the bottom layer or the elastic part of the mineral fibre board. Furthermore, the surface should be designed so that the ballast layer can be replaced. The ballast layer replacement may be carried out three or four times within the lifetime of the vibration damping system.

SUMMARY OF THE INVENTION

These and other objects are achieved by the vibration damping system as which includes an anti-vibration plate in the form of a plate having a first and a second major surface, wherein the first major surface may preferably be covered with a layer of surfactant-free geotextile. The anti-vibration plate includes one or more layers, preferably a top layer and one or more bottom layers. The top layer and the one or more bottom layers both include mineral fibres and a binder, preferably a cured binder.

The vibration damping system according to the invention has shown to possess a very high vibration damping effect, whereby undesired vibrations from railway traffic and likewise can be reduced to an acceptable level or even be substantially eliminated. It has been found that the vibration damping effect of the vibration damping system is only slightly or not at all influenced by the temperature of the surrounding environment, which means that the system works effectively under a wide range of temperatures.

Furthermore, the installed vibration damping system according to the invention is competitive with respect to vibration damping systems composed of e.g. rubber alone. Another desired property of the vibration damping system is its durability which is highly increased due to the construction, because gravel, stone, soil, asphalt and other covering materials do not result in significant deterioration of the mineral fibre material.

In a preferred embodiment of the vibration damping system according to the invention the anti-vibration plate comprises at least a top layer and one or more bottom layers. The top layer is in the form of a pressure distributing layer and the one or more bottom layers in the form of a vibration damping layer. The top layer and the one or more bottom layers may have different densities, different thicknesses and comprise different amount of binder.

The top layer preferably has a density of 250-400 kg/m$^3$ more preferably 300-350 kg/m$^3$ and has a thickness of 5-20 mm, more preferably 10-15 mm, and comprises a binder of preferably at least 4-6% by weight.

The one or more bottom layers preferably have a density of 100-250 kg/m$^3$, more preferably 180-200 kg/m$^3$, and have a thickness of 5-150 mm, preferably 35 mm, and comprise a binder of preferably 3-5% by weight.

Each of the layers of mineral fibres should preferably comprise at least 20%, preferably at least 50% and more preferably at least 80% by weight of one or more types of mineral fibres, e.g. rock, slag, glass and similar vitreous materials.

Furthermore it is essential that the anti-vibration plate is preferably obtainable by a method comprising the step of subjecting an area of the opposite surfaces of the plate to a compression treatment in one or more steps, which compression treatment is sufficient to reduce the static and/or the dynamic stiffness of the plate by at least 10%, preferably at least 15%, more preferably at least 20%, compared to the static and/or dynamic stiffness prior to the compression. An anti-vibration plate obtainable by this method thus has a constant perfomance, that is a constant static and dynamic stiffness over time.

In a preferred embodiment the anti-vibration plate is obtainable by a method comprising the step of subjecting an area of the opposite surfaces of the plate to a compression treatment, wherein the compression treatment comprises the step of subjecting an area of the opposite surfaces of the plate at the compression pressure in the interval from 50 to 250 kN/m$^2$, preferably from 80 to 200 and more preferably from 100 to 150 kN/m$^2$, whereby the static and/or dynamic stiffness of the plate measured according to the method defined in Deutsche Bahn-Norm BN 918 071-1 (September 2000) is reduced compared to the static stiffness prior to the compression treatment.

In general, it is insignificant which method has been used for subjecting the opposite surfaces of the plate to the compression treatment, however, due to the object to provide a simple and economical method, and thereby an economically acceptable product, the anti-vibration plate can be obtained by a method comprising the step of subjecting the plate to a compression treatment by rolling through one or more pairs of rollers, thereby providing a nip between the one or more rollers making contact with the first major surface and the one or more rollers making contact with the second major surface.

When using this method, the one or more pairs of rollers could have same or different diameters. In a preferred embodiment the one or more rollers in contact with the first major surface have a diameter substantially higher than the thickness of the antivibration plate, e.g. in the ratio 10:1, preferably 8:1, more preferably 6:1, and most preferably 2:1. The one or more rollers in contact with the second major surface have a diameter substantilly lower than the thickness of the antivibration plate, e.g. in the ratio 1:10, preferably 1:8, more preferably, 1:6 and most preferably 1:2. The one or more rollers in contact with the first major surface or second major surface having a diameter substantially higher or lower than the thickness of the antivibration plate result in different pressures being exerted over the surface of the antivibration plate.

In another preferred embodiment of the invention, the compression treatment of the anti-vibration plates may be carried out by joining two anti-vibration plates so that the higher density layers of the plates face each other. The composite anti-vibration plate can be subjected to a compression treatment by rolling it through one or more pair of rollers, thus providing a nip between the one or more rollers making contact with the second major surface of the one anti-vibration plate, i.e. its lower density layer, and the one or more rollers making contact with the second major surface of the other anti-vibration plate, i.e. its lower density layer. When using this method, the one or more pairs of rollers could have the same or different diameters, said diameters being preferably smaller than the thickness of either anti-vibration plate.

In a further preferred embodiment of the invention the anti-vibration plates comprising two layers of different densities may be stacked one on top of another to conform a transport unit, wherein the higher density layer of each anti-vibration plate faces the lower density layer of the adjacent anti-vibration plate of the stack. The transport unit as a single entity is thereafter subjected to a compression step over the surface of its uppermost surface.

The anti-vibration plate or at least the exposed surfaces of the plate may be hydrophobic. The surface tension of the fibre material of the plate should preferably not be higher than the surface tension of the natural non-bonded and treated fibres. In some embodiments the plate should preferably be sufficiently hydrophobic to avoid any substantial entrance of water, when water drops at 20° C. are sprayed onto the plate. Particularly, it is preferred that the anti-vibration plate has a surface tension below 73 dynes/cm, e.g. having a surface tension below 40 or even below 30 dynes/cm.

Methods of making the mineral fibres hydrophobic are well known in the art.

The vibration damping system according to the invention may also comprise two or more anti-vibration plates placed upon each other where the edge or edges of the plates are placed in distance from each other in order to cover joints. If the plates have different densities, the plate with the higher density should preferably be placed upon the plate with the lower density.

During the life time of an anti-vibration plate, the ballast layer may be exchanged several times. In order to provide a strong and resistant surface of the anti-vibration plate to increase its ability to withstand exchanges of ballast layer, the anti-vibration plate is covered on the first of its major side surfaces with a layer of surfactant-free geotextile.

The geotextile may in principle be any type of geotextile provided that it is surfactant-free. By the term "geotextile" is meant any flexible plane structure of fibres.

By the term "surfactant-free" is meant that the fibres of the geotextile have not been treated with a surfactant, which in this application means a wetting agent or a tenside (surface tension decreasing agent).

The surfactant-free geotextile should preferably have a thickness of at least 0.1 mm, more preferably between 0.4 and 3 mm measured according to EN 964-1 under a load of 2 kN/m$^2$. A thickness between 0.5 and 1 mm will in most applications be optimal.

The surfactant-free geotextile may preferably be selected from the group consisting of staple fibre, continuous nonwoven filament, thread-structure mats and strip mats. In a preferred embodiment the surfactant-free geotextile is a non-woven textile. These types of mats and their preparation are generally known to a skilled person. It has been found that a non-woven surfactant-free geotextile in general provides the anti-vibration plate with an optimal surface protection. The surfactant-free geotextile may e.g. be substantially watertight or alternatively it may be permeable to water.

The surfactant-free geotextile could in principle be of any kind of material. However, in order to obtain a stable and sufficiently strong geotextile, it is preferred that the surfactant-free geotextile is made from fibres, threads or filaments of a material selected from the group consisting of polyester, polyamide, polypropylene, polyether, polyethylene, polyetheramide, polyacrylnitrile, glass or a combination thereof.

The surfactant free geotextile is preferably made from fibres or filaments of polyamide coated polyester or polypropylene.

The surfactant-free geotextile may preferably be fixed to the anti-vibration plate e.g. by heat fusing or gluing.

In order to protect the anti-vibration plate to an optimal degree, the surfactant-free geotextile should preferably have a tensile strength of at least 8 kN/m, preferably at least 20 kN/m measured according to EN ISO 10319. Preferably the surfactant-free geotextile should have a tensile strength in all directions of its plane which is above 8 kN/m.

Useful structures of geotextile are e.g. the geotextile marketed under the trade name "Typar® SF" by DuPont® Nonwovens.

In the vibration damping system according to the invention the anti-vibration plate may be more or less covered by the surfactant-free geotextile along one or more of the two major surfaces. The anti-vibration plate may e.g. be totally coated by the surfactant-free geotextile or it may be coated on its first major surface. In most embodiments it is not necessary to cover more than the first major surface of the anti-vibration plate and since the surfactant-free geotextile is relatively expensive, it is normally avoided to cover more than the first major surface of the anti-vibration plate. Depending on the ground surface condition it may be necessary to cover the second major surface also.

The vibration damping system may preferably further comprise a layer of a drain-core material comprising a three-dimensional matting of looped filaments.

The looped filaments should preferably have a sufficiently high strength to avoid a complete and permanent collapse under the load of the gravel, stones or similar covering materials, which may be covering the vibration damping system. It is preferred that the looped filaments are made of polymeric monofilaments welded together where they cross, whereby an open structure with an open volume is provided. The looped filaments of the drain-core layer are preferably made from a material selected from the group consisting of polyamide, polyester, high-density polyethylene, polystyrene and combinations thereof. A particularly preferred material for the production of the looped filaments of the drain-core layer is polyamide.

The open volume should preferably constitute 80% or more of the total volume of the drain-core layer. The drain-core layer should preferably be placed between the first major surface of the anti-vibration plate and the covering layer of surfactant-free geotextile.

In a preferred embodiment of the vibration damping system according to the invention the vibration damping system further comprises a second layer of geotextile placed between the first major surface of the anti-vibration plate and the drain-core layer. Thus, this preferred embodiment includes a layered product comprising an mineral fibre board covered on its first major surface by a draining mat of a drain-core layer sandwiched between two layers of surfactant-free geotextile.

The thickness of the drain-core layer may preferably be up to about 15 mm. Drain-core layers thicker than that tend to be too soft for the requirement of static and dynamic stiffness of the system. Since the price of the drain-core layer is highly dependent on the height of this drain-core layer, it is preferred to use a height as low as possible of this layer, where the effect is optimal or at least satisfactory. It is preferred that the total thickness of the drain-core layer including the looped polyamide filaments, the surfactant-free geotextile and the second surfactant-free geotextile is at least 3 mm, preferably at least 5 mm. In general it is preferred that the surfactant-free geotextile is as thin as possible while still being able to provide a distribution of the forces against the underlying mineral fiber board. The geotextiles of the draining mat may preferably be glued or heat melted to the drain-core layer.

The second surfactant-free geotextile may be selected from the same group of materials and be of the same type as the surfactant-free geotextile as described above. The strength of the second surfactant-free geotextile is not so important, and, thus, the second surfactant-free geotextile may be of the same thickness as the surfactant-free geotextile or it may be thinner.

In a particularly preferred embodiment the draining mat is formed from two layers of surfactant-free geotextile of non-woven polyamide coated polyester fibres and a looped polyamide filament drain-core layer sandwiched between the two surfactant-free geotextile.

Useful draining mats of the above type are e.g. described in DE publication Nos. DE 2150590 and DE 4431976. A particularly preferred type of draining mats is marketed by Colbond Geosynthetics, The Netherlands, under the trade name Enkadrain®.

One or more of the surfaces which are not covered with geotextile may preferably be covered with a surface coating in the form of a fibrous netting formed of a thermoplastic polymer material. Particularly, it is preferred that one or more side surfaces of the anti-vibration plate are covered with such a surface coating in the form of a fibrous netting. Such covering material is further described in EP 629153.

The invention also relates to a method of preparing an anti-vibration plate according to the invention comprising the steps of preparing a plate comprising one or more layers, preferably a top layer and one or more bottom layers as defined above, and subjecting an area of the opposite surfaces of the plate to a compression treatment in one or more steps, which compression treatment is sufficient to reduce the static and/or the dynamic stiffness of the plate by at least 10%, preferably at least 15%, more preferably at least 20% compared to the static and/or dynamic stiffness prior to the compression treatment.

As mentioned above it is in general insignificant which method has been used for subjecting the opposite surfaces of the plate to the compression treatment, but it is preferred that the method comprises the step of subjecting the plate to a compression treatment by rolling through one or more pairs of rollers, thereby providing a nip between the one or more rollers making contact with the first major surface and the one or more rollers making contact with the second major surface. When using this method, the one or more pairs of rollers could have same or different diameters.

In a preferred embodiment the one or more rollers in contact with the first major surface have a diameter substantially higher than the thickness of the antivibration plate, e.g. in the ratio 10:1, preferably 8:1, more preferably 6:1, and most preferably 2:1. The one or more rollers in contact with the second major surface have a diameter substantilly lower than the thickness of the antivibration plate, e.g. in the ratio 1:10, preferably 1:8, more preferably, 1:6 and most preferably 1:2. The one or more rollers in contact with the first major surface or second major surface having a diameter substantially higher or lower than the thickness of the antivibration plate result in different pressures being exerted over the surface of the antivibration plate.

The invention also relates to a method of applying a vibration damping system to a ground subjected to vibrations.

The method comprises the steps of:
i providing an anti-vibration plate, preferably using the method as described above;
ii applying a layer of surfactant free geotextile onto the first major surface;
iii optionally covering one or more surfaces of the anti-vibration plate as described above;
iv applying the anti-vibration plate onto the ground with its first major surface upwardly prior to or after the application of the surfactant free geotextile onto the first major surface;
v covering the first major surface of the anti-vibration plate with concrete, stone, gravel, soil and/or asphalt.

Prior to the application of the vibration damping system the ground may preferably be prepared e.g. by levelling the ground in the depression in the ground, where the vibration damping system is to be applied. Furthermore, the ground may preferably be further stabilised e.g. by covering the ground with a material selected from the group consisting of water pervious foil, granulates of rubber, gravel or mixtures thereof.

If the major surface of the anti-vibration plate is covered with a covering layer in the form of a surfactant-free geotextile and/or drain-core layer or a draining mat, it is preferred that the surfactant-free geotextile and the anti-vibration plate are glued, sewed or heat fused together. This may be done on ground or in factory.

Alternatively, the anti-vibration plate may first be applied to the ground and thereafter a covering layer in the form of a surfactant-free geotextile and/or drain-core layer or a draining mat is applied onto the first major side of the anti-vibration plate.

If the vibration damping system further comprises a drain-core layer and/or a second layer of surfactant-free geotextile, these layers may be applied one by one onto the anti-vibration plate prior to the application of the surfactant-free geotextile, or these layers may be applied together with the surfactant-free geotextile in the form of a draining mat as defined above.

The draining mat may preferably be applied from a roll of draining mat material directly onto the anti-vibration plate or plates. It is preferred that the draining mat material from one roll covers two or more anti-vibrations plates. The width of the roll of draining mat material should preferably be at least substantially equal to the width of the anti-vibration plates.

When the vibration damping system has been safely applied, the first surface of the anti-vibration plate or optionally the covered first surface of the anti-vibration plate board may further be covered with concrete, stone, gravel, soil and/or asphalt or similar materials. Finally, a railway track may be applied onto the vibration damping system.

The vibration damping system according to the invention is preferably used for damping the vibrations caused by trains, trolley busses, tramcars and/or other traffic on a railway or roadway, wherein the use comprises incorporation of the vibration damping system in the ground under the railway and/or road.

EXAMPLE

An anti-vibration plate according to the invention having a first and a second major surface was provided as described in the following. The anti-vibration plate was made from rock wool. The anti-vibration plate comprised two layers, a top layer and a bottom layer. The top layer had a density of 350 kg/M$^3$, a thickness of 15 mm, and comprised a binder of 6% by weight. The bottom layer had a density of 200 kg/m$^3$, a thickness of 35 mm, and comprised a binder of 4% by weight. The dimension of the anti-vibration plate was about 35 mm×600 mm×100 mm. The anti-vibration plate was obtained by a method comprising the step of subjecting an area of the plate to a compression treatment. The compression treatment was made through rollers having different diameters. The compression treatment reduced the static and dynamic stiffness of the plate by about 10-20% compared to the static and dynamic stiffness prior to the compression. The static stiffness before the compression treatment was 0,025 N/mm$^3$ and after the compression treatment it was 0,020 N/mm$^3$, measured according to the method defined in BN 918 071-1. The dynamic stiffness before the compression treatment was 0,027 N/mm$^3$ and after the compression treatment it was 0,024 N/mm$^3$, measured according to the method defined in BN 918 071-1.

The invention claimed is:

1. A method of making an anti-vibration plate for a vibration damping system, comprising the steps of:
   a) providing a plate having a first major surface and an opposite second major surface, said plate comprising one or more layers comprising mineral fibres and a cured binder, and
   b) compressing an area of said opposite first and second major surfaces of said plate provided in step (a) to reduce the static and/or dynamic stiffness of the plate by at least 10% compared to a static and/or the dynamic stiffness of said plate prior to step (b), said plate provided in step a) comprising two of said layers comprising mineral fibers and cured binder, one of said layers defining a top layer and the other defining a bottom layer, said top layer defining said first major surface and said bottom layer defining said second major surface, said top layer and said bottom layers having different densities.

2. A method according to claim 1, wherein said compressing step involves applying a pressure of between 50 and 250 KN/m$^2$.

3. A method according to claim 1, wherein said compressing step comprises apply a pressure of between 80 and 200 KN/m$^2$.

4. A method according to claim 1, wherein said compressing step comprises applying a pressure of between 100 and 150 KN/m$^2$.

5. A method according to claim 1, wherein said layers having different amounts of said binder.

6. A method according to claim 1, wherein said plate provided in step a) has more than two of said layers comprising mineral fibers and cured binder, said layers having different thicknesses.

7. A method according to claim 1, wherein said plate provided in step a) has more than two of said layers comprising mineral fibers and cured binder, said layers having different amounts of said binder.

8. A method according to claim 1, wherein said mineral fibers are rock wool fibers.

9. A method according to claim 1, wherein after step b) a layer of surfactant free geotextile is applied on said first major surface.

10. A method according to claim 1, wherein said layers comprise at least 20% a by weight of said mineral fibres.

11. method according to claim 1, wherein said layers comprise at least 50% a by weight of said mineral fibres.

12. A method according to claim 1, wherein said layers comprise at least 80% a by weight of said mineral fibres.

13. A method of installing a vibration damping system on a ground surface comprising the steps of providing a vibration damping system comprising an anti-vibration plate having a first major surface and an opposite second major surface, said anti-vibration plate comprising one or more layers comprising mineral fibres and a cured binder, wherein said opposite major surfaces of said anti-vibration plate having been subjected to a compression treatment after curing to reduce the static and/or dynamic stiffness of said anti-vibration plate by at least 10%, compared to the static and/or the dynamic stiffness prior to said compression treatment, said anti-vibration plate comprising a top layer in the form of a force distributing layer and one or more bottom layers in the form of vibration damping layers, said top layer and at least one of said bottom layers having different densities, different thicknesses and comprising different amounts of binder, placing said vibration damping system on the ground surface, and covering the first major side of the anti-vibration plate with at least one of a layer of surfactant-free geotextile, a drain-core layer and a draining mat.

* * * * *